US012655894B2

(12) United States Patent
Dötschel et al.

(10) Patent No.: US 12,655,894 B2
(45) Date of Patent: Jun. 16, 2026

(54) DIFFERENTIAL TRANSMISSION FOR A VEHICLE

(71) Applicant: ZF Friedrichshafen AG, Friedrichshafen (DE)

(72) Inventors: Philip Dötschel, Friedrichshafen (DE); Tamas Gyarmati, Bermatingen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 18/967,323

(22) Filed: Dec. 3, 2024

(65) Prior Publication Data

US 2025/0180104 A1     Jun. 5, 2025

(30) Foreign Application Priority Data

Dec. 4, 2023    (DE) .......................... 102023212119.0

(51) Int. Cl.
F16H 48/10 (2012.01)
B60K 1/00 (2006.01)
F16H 48/38 (2012.01)

(52) U.S. Cl.
CPC .............. F16H 48/10 (2013.01); B60K 1/00 (2013.01); F16H 48/38 (2013.01); B60K 2001/001 (2013.01); F16H 2048/104 (2013.01); F16H 2048/106 (2013.01)

(58) Field of Classification Search
CPC .............. F16H 48/10; F16H 2048/104; F16H 2048/106; F16H 2003/442; B60K 2001/001
USPC ......................................................... 475/903
See application file for complete search history.

(56) References Cited

U.S. PATENT DOCUMENTS

| | | | | | |
|---|---|---|---|---|---|
| 5,845,732 | A | * | 12/1998 | Taniguchi .............. | B60K 17/16 180/65.6 |
| 8,968,139 | B2 | * | 3/2015 | Fukami ................... | F16H 48/10 475/150 |
| 10,300,905 | B2 | * | 5/2019 | Holmes ................... | F16H 48/10 |
| 11,635,131 | B2 | * | 4/2023 | Beck ........................ | B60K 1/00 475/150 |
| 11,815,169 | B2 | * | 11/2023 | Reisch .................... | F16H 48/10 |
| 11,846,346 | B2 | * | 12/2023 | Kölbl ................... | B60K 17/165 |
| 11,852,224 | B2 | * | 12/2023 | Brehmer ............... | B60K 17/08 |
| 11,892,066 | B2 | * | 2/2024 | Reisch ................. | B60K 17/356 |
| 12,025,211 | B2 | * | 7/2024 | Reisch .................... | F16H 48/38 |

FOREIGN PATENT DOCUMENTS

WO     WO-2005120877 A1 * 12/2005   ............. B60K 17/16

* cited by examiner

*Primary Examiner* — Sherry L Estremsky
(74) *Attorney, Agent, or Firm* — Dority & Manning, P.A.

(57)     ABSTRACT

A differential transmission for a vehicle includes a first planet carrier of a first planetary gearset connected with a first output shaft by a torque-proof connection. A second ring gear of a second planetary gearset is torque-proofly connected with a second output shaft. A sun ring gear forms a first ring gear of the first planetary gearset at an inner circumference and a second sun gear of the second planetary gearset at an outer circumference. A second planet carrier of the second planetary gearset is supported at a stationary component. A first planet carrier of the first planetary gearset is rotatably supported at the stationary component by a support. The support of the first planet carrier is arranged opposite the torque-proof connection in an axial direction with respect to a first planet gear.

16 Claims, 3 Drawing Sheets

DIFFERENTIAL TRANSMISSION FOR A VEHICLE

CROSS-REFERENCE TO RELATED APPLICATION

The present application is related and has right of priority to German Patent Application No. DE102023212119.0 filed on Dec. 4, 2023, which is incorporated by reference in its entirety for all purposes.

TECHNICAL FIELD

The present invention relates generally to a differential transmission for a vehicle. Furthermore, the present invention relates generally to a drive unit having a differential transmission, and to a vehicle having a drive unit.

BACKGROUND

Differential transmissions are often used in vehicles. Differential transmissions are used to enable drive wheels driven by the same motor to have different rotational speeds. This is required, for example, when cornering. The drive wheel on the inside of the curve covers a shorter path than the drive wheel on the outside of the curve. In this respect, the drive wheel on the inside of the curve has to rotate more slowly than the drive wheel on the outside of the curve.

SUMMARY

Example aspects of the present invention provide an improved differential transmission which has an extended service life, may be produced more cost-effectively and has a lower outlay in terms of installation space.

A differential transmission for a vehicle includes a first output shaft, a second output shaft, a first planetary gearset, a second planetary gearset, a sun ring gear, and a stationary component. The first output shaft and the second output shaft can extend out of the stationary component in an axial direction. In this case, the axial direction may be determined by the axis of rotation of the first output shaft. The first output shaft and the second output shaft can be coaxial to each other. The vehicle may be, for example, a commercial vehicle, such as a truck, a construction machine or agricultural machine, or a passenger car.

The first planetary gearset includes a first sun gear, a first planet carrier, a first planet gear, and a first ring gear. The first planetary gearset may include a plurality of planet gears, preferably three planet gears. The first planetary gearset may be formed as a plus or as a minus planetary gearset. The first sun gear is in engagement with the first planet gear, and the first planet gear is in engagement with the first ring gear. An engagement between two gear wheels is achieved by an overlap of the gear wheels in the axial direction and a spacing of the axes of rotation of the gear wheels in a radial direction, so that at least one tooth of the one gear wheel contacts a tooth of the second gear wheel. The first sun gear, the first planet carrier, and the first ring gear may be arranged coaxial to one another. The first sun gear may be used to drive the first planetary gearset.

The first planet carrier may be used as an output and is connected with the first output shaft by a torque-proof connection. The torque-proof connection may be arranged adjacent to the second output shaft in the region of an end of the first output shaft which is located inside the stationary component. The first output shaft may be arranged coaxially to the first sun gear.

If two elements are connected with each other, the two elements are directly or indirectly coupled with each other such that a movement of one element causes a reaction of the other element. For example, a connection may be provided by a form-fit or friction-fit connection. The connection may correspond to a meshing of corresponding toothings of the two elements. Between the elements, further elements may be provided, for example one or a plurality of spur gear stages. For example, a connection may be toque-proof.

A torque-proof connection of two elements is understood to mean a connection in which the two elements are rigidly coupled with each other in all intended states of the transmission, so that the two elements have substantially the same rotational speed. The elements may be present here as individual components connected torque-proofly with each other or also in one piece. A torque-proof connection may be designed as a splined shaft connection or as a toothed shaft connection. In this case, a securing element, for example a securing ring, snap ring or spiral ring, may be provided for limiting a relative movement in the axial direction. The torque-proof connection may be designed as a press connection or by screw connections of flanges of the first planet carrier and the first output shaft.

The first planet carrier is rotatably supported at the stationary component by a support. The support of the first planet carrier is arranged opposite the torque-proof connection in the axial direction with respect to the first planet gear. The axial direction may be the axial direction of a planet axis of the first planet carrier, on which the first planet gear is rotatably mounted. The support of the first planet carrier may be designed as a needle sleeve without an inner ring. A bushing may be present inside the needle sleeve. The bushing may be dispensed with if the first planet carrier is produced at least in sections from hardened steel.

As a result, the first planet carrier may be designed to be thinner and the service life of the differential transmission may be extended. In this case, no oil has to be guided between the first output shaft and the second output shaft. As a result, the second output shaft is not weakened and may be designed to be thinner-walled, which leads to a lower weight. In addition, corresponding sealing elements may be dispensed with, which leads to a cost advantage, installation space advantage and weight advantage. No direct oil supply through the stationary component to the support of the second output shaft is necessary, since in total fewer supports require oil.

The second planetary gearset includes a second sun gear, a second planet carrier, a second planet gear, and a second ring gear. The second planetary gearset may include a plurality of planet gears, preferably three planet gears. The second planetary gearset may be formed as a plus or as a minus planetary gearset. The second sun gear is in engagement with the second planet gear, and the second planet gear is in engagement with the second ring gear. The second sun gear, the second planet carrier, and the second ring gear may be arranged coaxial to one another and coaxial to the first sun gear, the first planet carrier, and the first ring gear. The second ring gear is connected with the second output shaft. The connection of the second ring gear with the second output shaft may be designed as a press connection or by screw connections in the axial direction of the second planet carrier to the second ring gear or by a shaft-hub connection. The connection of the second ring gear with the second output shaft may be torque-proof.

The sun ring gear forms the first ring gear at an inner circumference and the second sun gear at an outer circumference. The sun ring gear may be designed in one piece. In an alternative example embodiment, the sun ring gear may be designed in several parts. In this case, the sun ring gear includes the first ring gear, the second sun gear, and a coupling element. The first ring gear may then be torque-proofly connected at an inner circumference of the coupling element. The second sun gear may then be torque-proofly connected at an outer circumference of the coupling element.

The second planet carrier is supported at the stationary component. The support of the second planet carrier at the stationary component may be designed as a press connection, material bond or screw connection of the second planet carrier in the axial direction to the stationary component. Alternatively, the second planet carrier may be fixable to the stationary component via a shifting element. A torque-proof connection between two elements may be selectively established or released via a switching element, for example a clutch. The second planet carrier may include a second planet axis, on which the second planet gear is rotatably supported. The second planet axis may be supported at the stationary component. A cylindrical projection of the stationary component may form the second planet axis.

The stationary component may be a transmission housing. The transmission housing may completely surround the first planetary gearset and the second planetary gearset. The transmission housing may include a recess to enable a mechanical connection from outside the transmission housing to the first sun gear. In addition, the transmission housing may include recesses to enable an extension of the first output shaft and the second output shaft to an outside of the transmission housing.

In one example embodiment, the support of the first planet carrier may be supported at a cylindrical outer circumference of a section of the stationary component. For example, the cylindrical outer circumference may be provided at a cylindrical projection, which projects from the stationary component in the axial direction. An intermediate element may also be provided, which provides the cylindrical outer circumference and which is supported at the stationary component. An outer circumference of the support of the first planet carrier is provided at a cylindrical inner circumference of a section of the first planet carrier. An intermediate element may also be provided which provides the cylindrical inner circumference and which is supported at the first planet carrier.

In one example embodiment, the support of the first planet carrier may be supported at a cylindrical inner circumference of a section of the stationary component. For example, the cylindrical inner circumference may be provided in a bore or recess in the stationary component in the axial direction. An intermediate component may also be provided, which provides the cylindrical inner circumference and which is supported at the stationary component. An inner circumference of the support of the first planet carrier is provided at a cylindrical outer circumference of a section of the first planet carrier. An intermediate component may also be provided, which provides the cylindrical outer circumference and which is supported at the first planet carrier.

In one example embodiment, the differential transmission may include an input element. The input element may be torque-proofly connected with the first sun gear. The connection may be designed as a shaft-hub connection, press connection or by screw connections of flanges of the sun gear and the input element.

The input element is rotatably supported at the stationary component by a support. The first sun gear, the input element and the first output shaft may be arranged coaxially. As a result, a compact design of the differential transmission may be realized.

In one example embodiment, the support of the first planet carrier may be arranged outside the support of the input element in the radial direction. The supports may be coaxial to each other.

In one example embodiment, the support of the first planet carrier may overlap the support of the input element in the axial direction. In particular, this example embodiment may be used in combination with the arrangement of the support of a section of the first planet carrier in the radial direction outside the support of the input element. Furthermore, this example embodiment may be used in particular in combination with the backing of the support of the first planet carrier at the cylindrical outer circumference of a section of the stationary component. For example, the support of the input element may be arranged completely inside the support of the first planet carrier in the axial direction. In this case, a very compact design of the differential transmission in the axial direction is possible.

In one example embodiment, the support of the first planet carrier may be arranged next to the support of the input element in the axial direction. In particular, this example embodiment may be used in combination with the backing of the support of the first planet carrier at the cylindrical inner circumference of a section of the stationary component. This enables a simpler oil supply to the support of the first planet carrier. In this example embodiment, the diameter of the cylindrical inner circumference of a section of the stationary component may be selected to be small. It is advantageous here that small bearing diameters lead to low friction losses. In this respect, the efficiency of the differential transmission may be increased.

Furthermore, a bushing made of hardened steel may be provided at the cylindrical outer circumference of a section of the first planet carrier. The first planet carrier may then be produced, for example, from aluminum. Alternatively, a section of the first planet carrier may serve as a running surface for the support of the first planet carrier. The planet carrier may be produced, for example, at least partially or in sections from hardened steel. A separate bushing, which serves as a running surface for rolling bodies of the support of the first planet carrier, made of hardened steel at a cylindrical outer circumference of a section of the first planet carrier may then be dispensed with. This reduces the number of components of the differential transmission and enables a simple construction.

A cylindrical recess in the stationary component for a bearing seat, at which an outer ring of the support of the input element is mounted, may be used to form a bearing seat, at which an outer ring of the support of the first planet carrier is mounted. In other words, two bearing seats in the stationary component may be produced with one machining step. This reduces the production costs.

In one example embodiment, the first sun gear may be hollow. For example, the first sun gear may be ring-shaped. In this case, the first output shaft may extend through the first sun gear and coaxially to the first sun gear. As a result, a compact design of the differential transmission is possible.

In one example embodiment, the input element may be designed as a hollow shaft, wherein the first output shaft may extend through the input element. As a result, a compact design of the differential transmission may be realized.

In one example embodiment, the input element and the first sun gear may be formed in one piece. In other words, the input element may form the first sun gear. As a result, the number of components of the differential transmission may be reduced and a compact design of the differential transmission may be realized.

In one example embodiment, the sun ring gear may be ring-shaped. The first ring gear may be arranged radially inside the second sun gear, and the first ring gear may overlap the second sun gear in the axial direction. The first ring gear and the second sun gear may overlap such that the gear having the smaller extension in the axial direction is arranged inside the other gear. For example, the second sun gear may be wider than the first ring gear in the axial direction. Then, the first ring gear may be arranged inside the second sun gear in the axial direction, such that the first ring gear does not protrude from the second sun gear in the axial direction.

In one example embodiment, the second output shaft may be arranged coaxially to the first output shaft and opposite the first output shaft in the axial direction with respect to the stationary component. The first output shaft and the second output shaft may each extend as far as a drive wheel, a wheel hub or a cardan shaft of the vehicle. As a result, a compact design of the differential transmission is possible and the number of components of the differential transmission may be reduced.

In one example embodiment, a torque introduced into the first sun gear may be transmittable to the first output shaft and to the second output shaft.

In a further example embodiment, the first output shaft and the second output shaft may each be rotatably supported at the stationary component by a support. The supports of the first output shaft and the second output shaft may be arranged coaxially to each other.

The second output shaft may include a first support and a second support. The first support may be a floating bearing. The second support may be a fixed bearing. The first support of the second output shaft may be arranged outside the support of the first planet carrier in the radial direction. The first support of the second output shaft may overlap the support of the first planet carrier in the radial direction. The first support of the second output shaft and the support of the first planet carrier may be designed in the same way. The second support of the second output shaft may be arranged inside the support of the first planet carrier in the radial direction.

In one example aspect, a drive unit includes a motor and a differential transmission according to the previously described example embodiments. The motor is coupled to the differential transmission in order to drive the first sun gear.

In one example aspect, a vehicle includes a drive unit according to the previously described example embodiment and drive wheels. The drive unit is mounted in the vehicle in order to drive the drive wheels.

DETAILED DESCRIPTION

Figure 1:
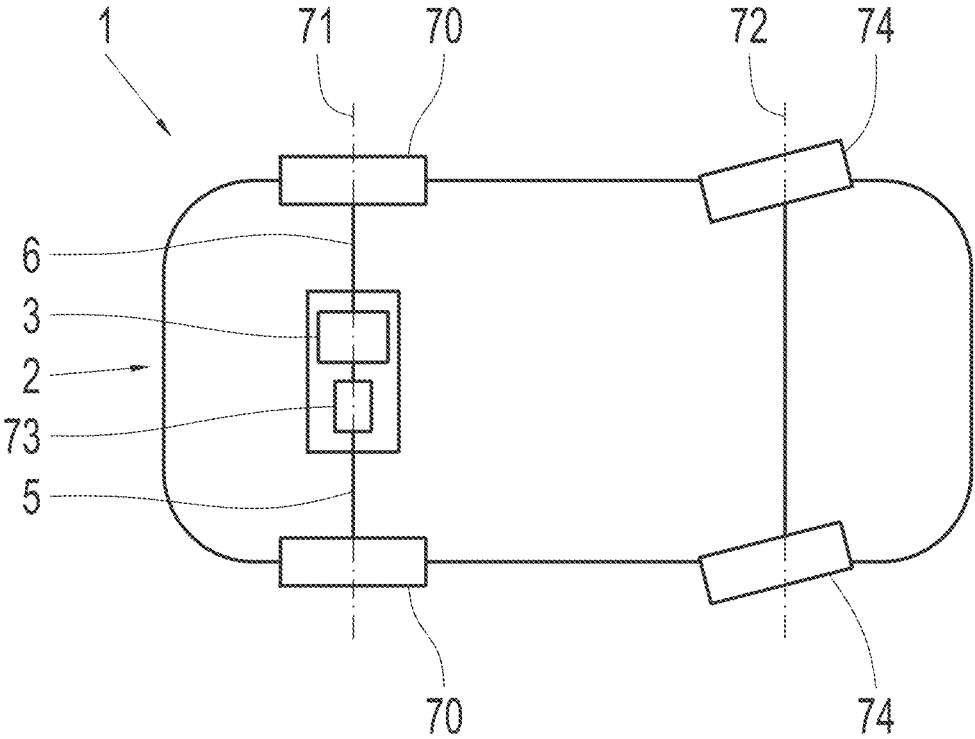
FIG. 1 shows a top view of a vehicle according to an example embodiment.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a top view of a vehicle 1 according to an example embodiment. The vehicle 1 includes a drive unit 2 having a motor 73, a differential transmission 3 having a first output shaft 5 and a second output shaft 6, drive wheels 70, a first axle 71, and a second axle 72. The motor 73 is an electric motor in the present example embodiment.

In an alternative example embodiment, the drive unit 2 is an internal combustion engine. The motor 73 is connected with the differential transmission 3 in such a way that the motor 73 may drive the first output shaft 5 and the second output shaft 6 by the differential transmission 3 and divide the driving power of the motor 73.

The first output shaft 5 and the second output shaft 6 extend from the differential transmission 3 in opposite directions parallel to that of the first axle 71 towards the drive wheels 70. The first output shaft 5 extends through the transmission 3 and the motor 73. The first axle 71 is a driven rear axle of the vehicle 1 in the present case. In an alternative example embodiment, the first axle 71 may be a driven front axle of the vehicle 1. The first output shaft 5 and the second output shaft 6 are connected with the drive wheels 70 of the vehicle 1 in such a way that the first output shaft 5 and the second output shaft 6 may each drive one of the drive wheels 70.

One of the drive wheels 70 transmits a driving power of the motor 73 to a ground on which the drive wheels 70 rest and generates a travelling motion of the vehicle 1. Steerable wheels 74 of the vehicle 1 are rotatably arranged on a second axle 72, in the present case a front axle. In an alternative example embodiment, the second axle 72 may be a rear axle of the vehicle 1.

In a further example embodiment, joints and wheel hubs may be arranged between the respective drive wheels 70 and the first output shaft 5 and the second output shaft 6 in order to compensate for possible misalignments of the first output shaft 5 and the second output shaft 6, respectively.

Figure 2:
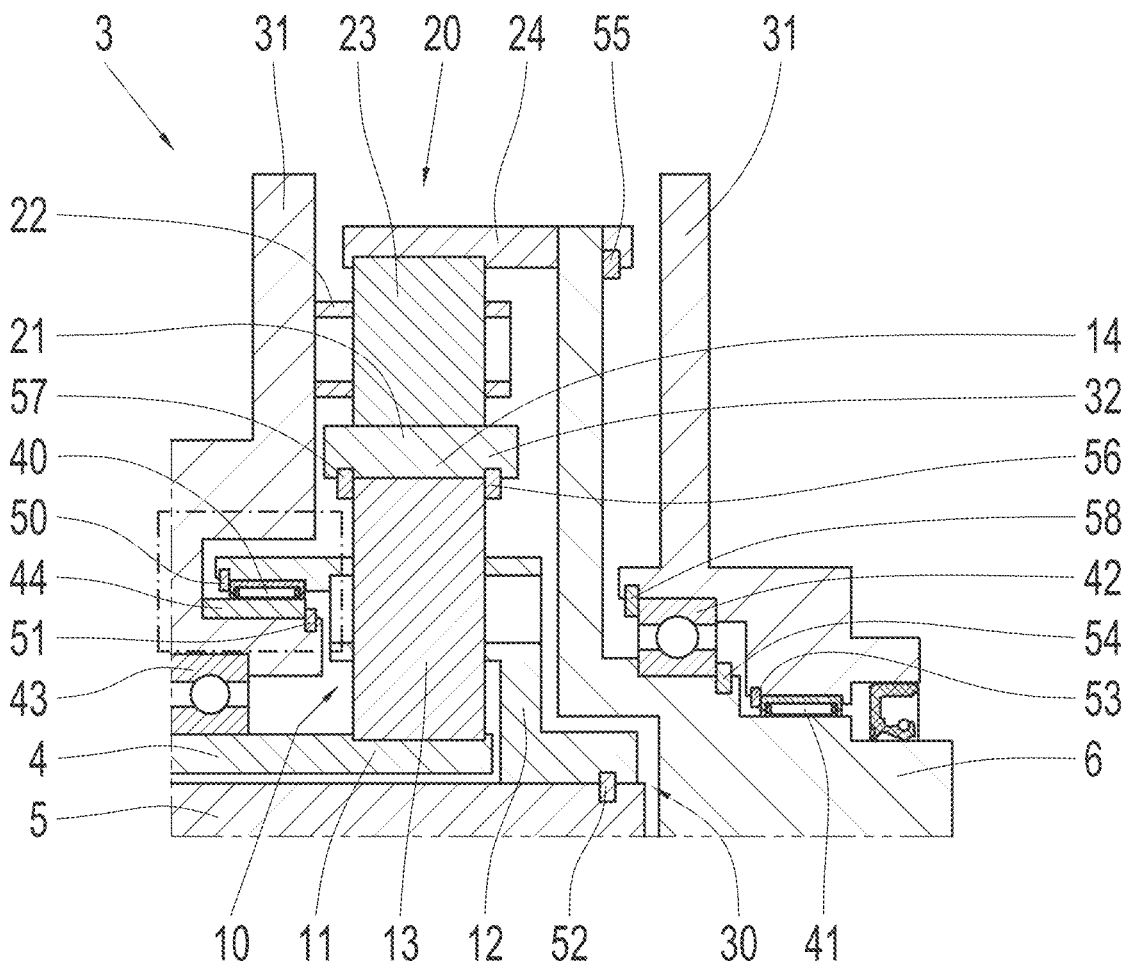
FIG. 2 shows a sectional view of a differential transmission for a vehicle according to an example embodiment.

FIG. 2 shows a sectional view of a differential transmission 3 for a vehicle 1 according to an example embodiment. FIG. 2 is a half-section showing an upper part of the differential transmission 3. The differential transmission 3 includes a stationary component 31, an input shaft 4, a first output shaft 5, and a second output shaft 6. The first output shaft 5 and the second output shaft 6 extend out of the stationary component 31 in opposite directions. The differential transmission 3 further includes a first planetary gearset 10 having a first sun gear 11, a first planet carrier 12, a number of first planet gears 13, and a first ring gear 14. The first planet gears 13 are each rotatably mounted by a first planet axis. The first planet carrier 12 is mounted in the stationary component 31 by a support 40. The first sun gear 11 is in engagement with the first planet gears 13.

The first planet gears 13 are in engagement with the first ring gear 14. The differential transmission 3 further includes a second planetary gearset 20 having a second sun gear 21, a second planet carrier 22, a number of second planet gears 23, and a second ring gear 24. The second planet gears 23 are each rotatably mounted by a second planet axis. The second sun gear 21 is in engagement with the second planet gears 23. The second planet gears 23 are in engagement with the second ring gear 24. The first sun gear 11, the first planet gears 13, the first ring gear 14, the second sun gear 21, the second planet gears 23, and the second ring gear 24 overlap in the axial direction.

The support 40 of the first planet carrier 12 is described in more detail below.

The support 40 of the first planet carrier 12 is arranged in the axial direction opposite a torque-proof connection 30 of the first planet carrier 12 with the first output shaft 5 with respect to the first planet gears 13 of the first planetary gearset 10. The first planet carrier 12 is thus supported on both sides in the axial direction with respect to the first planet gears 13. A radial force from one of the first planet gears 13 can thus be distributed to the support 40 of the first planet carrier 12 and the torque-proof connection 30. This leads to a more uniform force distribution in the first planet carrier 12.

The support 40 of the first planet carrier 12 is designed here as a needle sleeve without an inner ring. The support 40 of the first planet carrier 12 further includes a bushing 44, here a hardened steel sleeve. The bushing 44 is arranged radially inside the needle sleeve. Needles of the needle sleeve can thus roll on the bushing 44. In this case, the bushing 44 is positioned such that the bushing 44 projects beyond the needle sleeve in the axial direction. The width of the bushing 44 in the axial direction is greater than the width of the needle sleeve.

The differential transmission 3 further includes an input element 4. The input element 4 is rotatably supported at the stationary component 31 by a support 43.

The support 40 of the first planet carrier 12 overlaps the support 43 of the input element 4 in the axial direction. In this case, the support 40 of the first planet carrier 12 is arranged outside the support 43 of the input element 4 in the radial direction. In other words, the support 40 of the first planet carrier 12 is arranged above the support 43 of the input element 4 in the sectional view in FIG. 2. A compact installation space of the differential transmission 3 in the axial direction can thus be achieved.

Further details of the example embodiment are described below.

The input element 4 is formed as a hollow shaft. The input element 4 can rotate about the central axis of the input element 4. The input element 4 is torque-proofly connected with a rotor shaft of the motor 73 and is driven therewith. The rotor shaft of the motor is not shown in FIG. 2. The first sun gear 11 is hollow and formed in one piece with the input element 4. The first output shaft 5 extends through the first sun gear 11 and the input element 4 and is coaxial to the first sun gear 11.

The differential transmission 6 includes a sun ring gear 32. The sun ring gear 32 is hollow and ring-shaped. The sun ring gear 32 forms the first ring gear 14 at an inner circumference and the second sun gear 21 at an outer circumference. The sun ring gear 32 is arranged radially outside the first planet gears 13. The sun ring gear 32 is simultaneously in engagement with the first planet gears 13 and the second planet gears 23.

The second planet carrier 22 is supported at the stationary component 31 in a torque-proof manner in that the second planet carrier 22 is fastened to the stationary component 31 in the axial direction. The second ring gear 24 is torque-proofly connected with the second output shaft 6. The first output shaft 5 and the second output shaft 6 are coaxial to each other and rotatably supported in the stationary component 31.

In a further example embodiment, which includes all the features of the preceding example embodiment, the stationary component 31 is a two-part transmission housing. A section of a first part of the two-part transmission housing is shown in FIG. 2 on the left side of the differential transmission 3. A section of a second part of the two-part transmission housing is shown in FIG. 2 on the right side of the differential transmission 3. The two parts of the two-part transmission housing are circumferentially connected with each other by screw connections. The screw connections are not shown in FIG. 2.

The support 40 of the first planet carrier 12 forms a floating bearing. The support 43 of the input element 4 is in the present case a grooved ball bearing and forms a fixed bearing.

The first output shaft 5 is rotatably supported in the stationary component 31 by a support, which is not shown. The support of the first output shaft 5, here a grooved ball bearing, is designed as a fixed bearing.

The second output shaft 6 is rotatably supported at the stationary component 31 by a first support 41 and a second support 42. The first support 41 of the second output shaft 6, here a needle bearing, is a floating bearing. The second support 42 of the second output shaft 6, here a grooved ball bearing, is a fixed bearing. In an alternative embodiment, the first support 41 is designed as a fixed bearing and the second support 42 is designed as a floating bearing.

In a further example embodiment, which includes all the features of the preceding example embodiment, the width of the first sun gear 11 in the axial direction is greater than the width of the first planet gears 13. Furthermore, the width of the sun ring gear 32 in the axial direction is greater than the width of the first planet gears 13 and the second planet gears 23, respectively. Furthermore, for positioning the sun ring gear 32 relative to the first planet gears 13 in the axial direction, securing elements 56, 57, here snap rings, and thrust washers are provided at an inner circumference of the sun ring gear 32 on both sides of the first planet gears 13.

An outer ring of the needle sleeve of the support 40 of the first planet carrier 12 is positioned in the axial direction by a shoulder of the first planet carrier 12 and a securing element 50, here a snap ring. The bushing 44 is positioned in the axial direction by a shoulder of the stationary component 31 and a securing element 51, here a securing ring.

An outer ring of the first support 41 of the second output shaft is positioned in the axial direction by a shoulder in the stationary component 31 and by a securing element 53, here a snap ring. An outer ring of the second support 42 is positioned in the axial direction by a shoulder in the stationary component 31 and by a securing element 58, here a snap ring. An inner ring of the second support 42 is positioned in the axial direction by a shoulder in the second output shaft 6 and by a securing element 54, here a snap ring.

The width of the second ring gear 24 is greater than the width of the second planet gears 23. For the torque-proof connection of the second ring gear 24 to the second output shaft 6, the second ring gear 24 and the second output shaft 6 each includes a toothing of a shaft-hub connection. Furthermore, the torque-proof connection includes a securing element 55, here a snap ring, for relative positioning in the axial direction.

The torque-proof connection 30 of the first planet carrier 12 with the first output shaft 5 includes a securing element 52, here a snap ring, for axial relative positioning. In the present example embodiment, the input element 4 is formed in one piece with the rotor shaft and is rotatably supported in the stationary component 31 via a rotor support. In an alternative example embodiment, the input element 4 includes a toothing for a shaft-hub connection for a torque-proof connection of the input element 4 to the rotor shaft.

Figure 3:
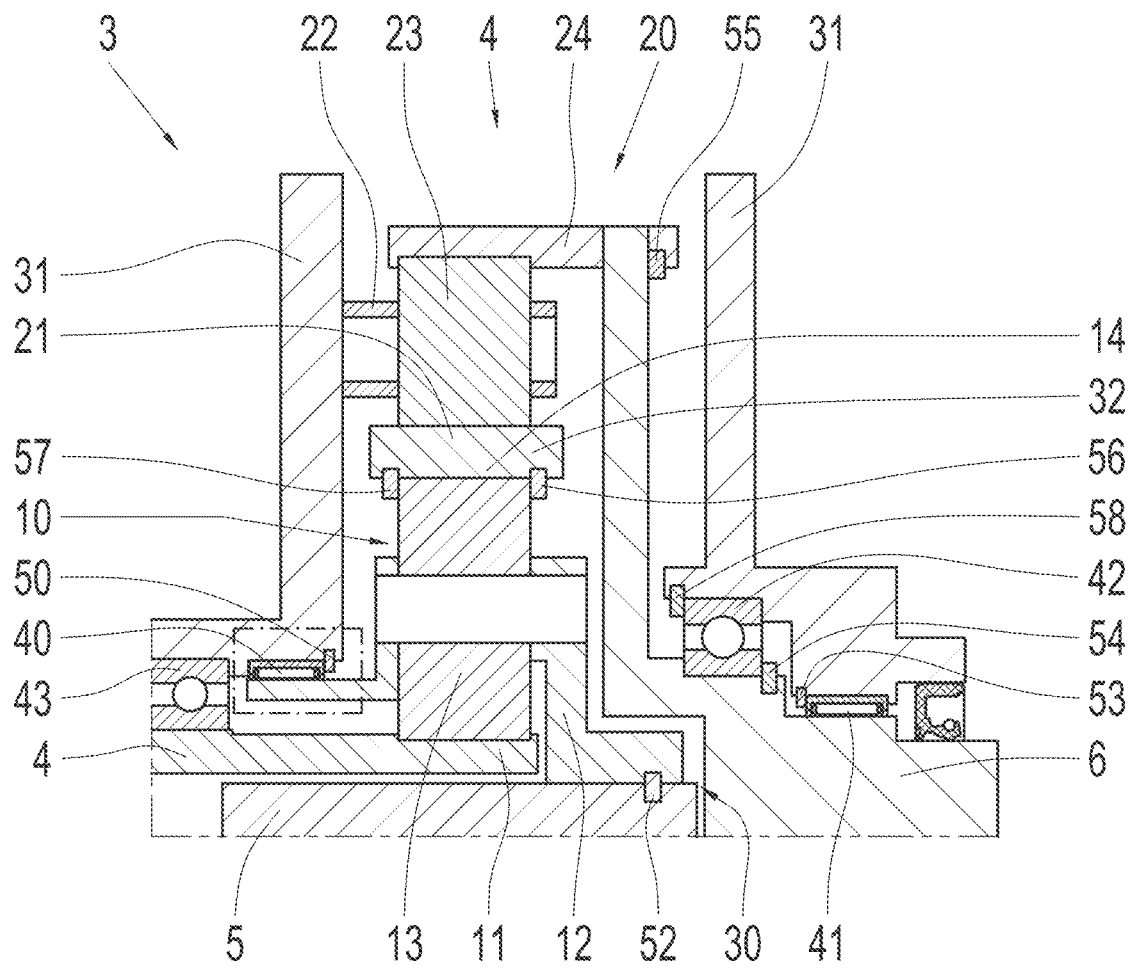
FIG. 3 shows a sectional view of a differential transmission for a vehicle according to an alternative example embodiment.

FIG. 3 shows a sectional view of a differential transmission 3 for a vehicle 1 according to an alternative example embodiment of the present invention. The present example embodiment differs from the preceding example embodiments in that the support 40 of the first planet carrier 12 is designed differently than in the preceding example embodiments. All other features are identical to the previously described example embodiments.

The support 40 of the first planet carrier 12 is arranged next to the support 43 of the input element 4 in the axial direction. The support 40 of the first planet carrier 12 is arranged inside the support 43 of the input element in the radial direction. The bushing 44 of the support 40 of the first planet carrier 12 may be dispensed with here, since the first planet carrier 12 is produced at least partially or in regions from hardened steel. In an alternative example embodiment, the first planet carrier 12 is produced from aluminum. The bushing 44 is then provided at an outer circumference of a section of the first planet carrier 12.

In a further example embodiment, the outer ring of the support 40 of the first planet carrier 12 is positioned in the axial direction by a shoulder of the stationary component 31 and a securing ring 50, here a snap ring.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE SIGNS 1 vehicle
2 drive unit
3 differential transmission
4 input element
5 first output shaft
6 second output shaft
10 first planetary gearset
11 first sun gear of the first planetary gearset
12 first planet carrier of the first planetary gearset
13 first planet gear of the first planetary gearset
14 first ring gear of the first planetary gearset
20 second planetary gearset
21 second sun gear of the second planetary gearset
22 second planet carrier of the second planetary gearset
23 second planet gear of the second planetary gearset
24 second ring gear of the second planetary gearset
30 torque-proof connection
31 stationary component
32 sun gear
40 support of the first planet carrier
41 first support of the second output shaft

42 second support of the second output shaft
43 support of the input element
44 bushing
50, 51, 52, 53, 54, 55, 56, 57, 58 securing element
70 drive wheel
71 first axle
72 second axle
73 motor
74 steerable wheel

The invention claimed is:

1. A differential transmission (3) for a vehicle, comprising:
   a first output shaft (5);
   a second output shaft (6);
   a first planetary gearset (10) comprising a first sun gear (11), a first planet carrier (12), a first planet gear (13), and a first ring gear (14), the first sun gear (11) engaged with the first planet gear (13), the first planet gear (13) engaged with the first ring gear (14), the first planet carrier (12) connected with the first output shaft (5) by a torque-proof connection (30);
   a second planetary gearset (20) comprising a second sun gear (21), a second planet carrier (22), a second planet gear (23), and a second ring gear (24), the second sun gear (21) engaged with the second planet gear (23), the second planet gear (23) is engaged with the second ring gear (24), the second ring gear (24) connected with the second output shaft (6);
   a sun ring gear (32) forming the first ring gear (14) at an inner circumference and the second sun gear (21) at an outer circumference; and
   a stationary component (31),
   wherein the second planet carrier (22) is supported at the stationary component (31), and the first planet carrier (12) is rotatably supported at the stationary component (31) by a support (40), and
   wherein the support (40) of the first planet carrier (12) is arranged opposite the torque-proof connection (30) in an axial direction with respect to the first planet gear (13), the support (40) of the first planet carrier (12) being supported at a cylindrical outer circumference of a section of the stationary component (31) or at a cylindrical inner circumference of part of the stationary component (31).

2. The differential transmission (3) of claim 1, further comprising an input element (4) torque-proofly connected to the first sun gear (11) and rotatably supported at the stationary component (31) by an additional support (43).

3. The differential transmission (3) of claim 2, wherein the support (40) of the first planet carrier (12) is arranged outside the additional support (43) of the input element (4) in a radial direction.

4. The differential transmission (3) of claim 2, wherein the support (40) of the first planet carrier (12) overlaps the additional support (43) of the input element (4) in the axial direction.

5. The differential transmission (3) of claim 2, wherein the support (40) of the first planet carrier (12) is arranged next to the additional support (43) of the input element (4) in the axial direction.

6. The differential transmission (3) of claim 1, wherein the first sun gear (11) is hollow, and the first output shaft (5) extends through the first sun gear (11) and coaxially to the first sun gear (11).

7. The differential transmission (3) of claim 6, wherein:

an input element (4) is torque-proofly connected to the first sun gear (11) and rotatably supported at the stationary component (31) by an additional support (43);

the input element (4) is configured as a hollow shaft; and the first output shaft (5) extends through the input element (4).

8. The differential transmission (3) of claim 6, wherein:

an input element (4) is torque-proofly connected to the first sun gear (11) and rotatably supported at the stationary component (31) by an additional support (43); and the input element (4) and the first sun gear (11) as one piece.

9. The differential transmission (3) of claim 1, wherein:

the sun ring gear (32) is ring-shaped;

the first ring gear (14) is arranged radially inside the second sun gear (21); and the first ring gear (14) overlaps the second sun gear (21) in the axial direction.

10. The differential transmission (3) of claim 1, wherein the second output shaft (6) is arranged coaxially to the first output shaft (5) and opposite the first output shaft (5) in the axial direction.

11. The differential transmission (3) of claim 1, wherein a torque introduced into the first sun gear (11) is transmittable to the first output shaft (5) and to the second output shaft (6).

12. A drive unit (2), comprising:

a motor (73); and the differential transmission (3) of claim 1, wherein the motor (73) is coupled to the differential transmission (3) in order to drive the first sun gear (11).

13. A vehicle, comprising:

the drive unit (2) of claim 12; and drive wheels (71), wherein the drive unit (2) is mounted in the vehicle (1) in order to drive the drive wheels (71).

14. The differential transmission (3) of claim 1, wherein the support (40) comprises a bearing.

15. The differential transmission (3) of claim 14, wherein the bearing comprises a needle sleeve having needles.

16. The differential transmission (3) of claim 1, wherein the second planetary carrier (22) is torque-proofly fastened to the stationary component (31).

* * * * *